United States Patent
Han et al.

(10) Patent No.: US 11,820,355 B2
(45) Date of Patent: Nov. 21, 2023

(54) METHOD OF CONTROLLING MOTOR TORQUE FOR LEARNING RESOLVER OFFSET OF ELECTRIC VEHICLE

(71) Applicants: Hyundai Motor Company, Seoul (KR); Kia Corporation, Seoul (KR)

(72) Inventors: Soo Lim Han, Gyeonggi-do (KR); Jun Beom Wi, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 174 days.

(21) Appl. No.: 17/500,034

(22) Filed: Oct. 13, 2021

(65) Prior Publication Data

US 2022/0169231 A1 Jun. 2, 2022

(30) Foreign Application Priority Data

Nov. 30, 2020 (KR) .......... 10-2020-0163559

(51) Int. Cl.
*B60W 10/08* (2006.01)
*B60L 15/02* (2006.01)

(52) U.S. Cl.
CPC .......... *B60W 10/08* (2013.01); *B60L 15/025* (2013.01); *B60W 2510/083* (2013.01); *B60W 2710/083* (2013.01)

(58) Field of Classification Search
CPC ...... B60K 17/354; B60K 17/356; B60K 6/20; B60K 6/26; B60K 6/387; B60K 6/52; B60L 15/025; B60W 10/02; B60W 10/08; B60W 20/15; B60W 2510/083; B60W 2510/1005; B60W 2520/28; B60W 2540/10; B60W 2540/12; B60W 2710/083
See application file for complete search history.

(56) References Cited

U.S. PATENT DOCUMENTS

| | | | | |
|---|---|---|---|---|
| 5,148,883 A | * | 9/1992 | Tanaka | B60L 50/60 180/197 |
| 5,705,872 A | * | 1/1998 | Loge | H01F 38/18 310/171 |
| 6,118,201 A | * | 9/2000 | Dulin | G01D 5/2086 336/84 R |
| 6,876,120 B2 | * | 4/2005 | Miya | G01D 5/204 323/348 |

(Continued)

FOREIGN PATENT DOCUMENTS

KR 2013-0115677 A 10/2013

*Primary Examiner* — Carl C Staubach
(74) *Attorney, Agent, or Firm* — Fox Rothschild LLP (57) ABSTRACT

A method of controlling motor torque for learning a resolver offset of an electric vehicle includes steps of: determining whether a condition for offset learning mounted to a main drive motor and to an auxiliary drive motor is satisfied; controlling an output torque of a learning drive motor, which includes a resolver to perform the offset learning among the main drive motor and the auxiliary drive motor to a zero torque, when the condition for performing the offset learning is satisfied; increasing an output torque of a non-learning drive motor, which includes a resolver not performing the offset learning among the main drive motor and the auxiliary drive motor by a torque reduction amount, when the learning drive motor outputs zero torque; and performing the offset learning of the resolver mounted to the learning drive motor.

6 Claims, 6 Drawing Sheets

(56) References Cited

U.S. PATENT DOCUMENTS

| | | | | |
|---|---|---|---|---|
| 6,891,460 | B2* | 5/2005 | Tezuka | H01F 38/18 |
| | | | | 318/605 |
| 10,256,754 | B2* | 4/2019 | Park | H02K 11/225 |
| 10,401,197 | B2* | 9/2019 | Park | G01D 5/24495 |
| 10,690,526 | B2* | 6/2020 | Park | G01D 18/002 |
| 2013/0275069 | A1* | 10/2013 | Bang | B60L 15/20 |
| | | | | 702/94 |
| 2014/0231165 | A1* | 8/2014 | Hori | B60L 3/106 |
| | | | | 180/242 |
| 2018/0264947 | A1* | 9/2018 | Suzuki | B60L 15/20 |
| 2019/0135297 | A1* | 5/2019 | Takahashi | B60W 10/119 |
| 2020/0007017 | A1* | 1/2020 | Hair | H02K 11/26 |
| 2021/0101489 | A1* | 4/2021 | Yano | B60W 10/08 |

* cited by examiner

METHOD OF CONTROLLING MOTOR TORQUE FOR LEARNING RESOLVER OFFSET OF ELECTRIC VEHICLE

CROSS REFERENCE TO RELATED APPLICATION

The present application claims under 35 U.S.C. § 119(a) the benefit of Korean Patent Application No. 10-2020-0163559, filed Nov. 30, 2020, the entire contents of which are incorporated by reference herein.

BACKGROUND

(a) Technical Field

The present disclosure relates generally to a method of controlling motor torque for learning a resolver offset of an electric vehicle, more particularly, to the method of controlling motor torque for learning the resolver offset of the electric vehicle in which a driver request torque is satisfied when resolver offset learning is performed during running of the electric vehicle, so that a sense of heterogeneity due to backward movement of the vehicle is reduced and the resolver offset learning is stably performed.

(b) Description of the Related Art

In recent years, a front wheel drive motor and a rear wheel drive motor have been applied to electric vehicles in order to increase an acceleration start feeling and a maximum speed.

In the case of an electric vehicle with two or more drive motors, an auxiliary drive motor to reduce power consumption and a dog clutch (or "disconnector") to remove drag of a reducer may be applied to the electric vehicle.

In a motor system of the electric vehicle, it is essential to measure an electric angle of a motor for precise motor torque control.

In general, a resolver is used to precisely measure the motor electric angle, and offset learning of the resolver is performed to obtain precise motor torque control.

Although resolver offset learning is performed when vehicle assembly is completed, the resolver offset learning is continuously performed under a predetermined condition during running of the vehicle for precise motor torque control.

The resolver offset learning is performed in a situation where a drive motor is rotating with inertia of a vehicle after outputting a zero torque. Accordingly, when the resolver offset learning is performed during running of the vehicle, the offset learning is performed in a limited condition in order to prevent a driver from feeling a sense of heterogeneity.

However, when the resolver offset learning is performed while a vehicle runs during coasting in which deceleration and acceleration are not initiated by a driver, the driver inevitably may experience a sense of pulling back of the vehicle and a sense of heterogeneity due to zero torque output of the drive motor.

SUMMARY

Accordingly, the present disclosure proposes a method of controlling motor torque for learning a resolver offset of an electric vehicle, wherein the torque reduction amount generated by zero torque output of a drive motor for resolver offset learning when the resolver offset learning is performed during running of the vehicle is compensated with torque output from another drive motor to satisfy a driver request torque, so that a sense of heterogeneity due to backward movement of a vehicle is reduced and the resolver offset learning is stably performed.

In order to achieve the above object, according to one aspect of the present disclosure, there is provided a method of controlling motor torque for learning a resolver offset of an electric vehicle, the electric vehicle including a main drive motor for driving a main drive wheel and an auxiliary drive motor for driving an auxiliary drive wheel, the method including: determining, by a vehicle control unit, whether a condition for offset learning of a plurality of resolvers mounted to the main drive motor and to the auxiliary drive motor is satisfied; controlling, by a motor control unit, an output torque of a learning drive motor, which is a drive motor with a resolver (of the plurality of resolvers) to perform the offset learning among the main drive motor and the auxiliary drive motor to a zero torque, when the condition for performing the offset learning is satisfied; increasing, by the motor control unit, an output torque of a non-learning drive motor, which is a drive motor with a resolver (of the plurality of resolvers) not performing the offset learning among the main drive motor and the auxiliary drive motor by a torque reduction amount when the learning drive motor outputs zero torque; and performing, by the motor control unit, the offset learning of the resolver mounted to the learning drive motor.

The motor torque control method has detailed features as follows.

While performing the offset learning of the resolver mounted to the learning drive motor, the output torque of the learning drive motor may be maintained to zero torque, and the output torque of the non-learning drive motor may be maintained to a torque value compensated with the torque reduction amount of the learning drive motor. The torque reduction amount of the learning drive motor may be the output torque that may be output by the learning drive motor before the learning drive motor performs the resolver offset learning.

When the resolver offset learning is completed, the output torque of the learning drive motor and the output torque of the non-learning drive motor may be recovered to torque values before performing the resolver offset learning.

When an acceleration pedal and a brake pedal are not in operation, a transmission gear may be located on a running gear, and wheel speed may be equal to or higher than a preset value of wheel speed, it may be determined that the condition for performing the resolver offset learning may be satisfied.

The motor torque control method may include: determining whether a disconnector connecting the auxiliary drive motor to the auxiliary drive wheel to be power-transmittable is in an engaged state, wherein when the condition for the resolver offset learning is satisfied and the disconnector is in the engaged state, the auxiliary drive motor may be set as the learning drive motor, and the main drive motor may be set as the non-learning drive motor. In other words, the output torque of the auxiliary drive motor may be controlled to the zero torque and the output torque of the main drive motor may be increased by a torque reduction amount according to the zero torque output of the auxiliary drive motor.

When the condition for the resolver offset learning is satisfied and the disconnector is released from the engaged state, the auxiliary drive motor and the auxiliary drive wheel may be connected to be power-transmittable as the disconnector is brought into the engaged state, and the main drive motor may be set as the learning drive motor and the auxiliary drive motor may be set as the non-learning drive motor. In other words, the output torque of the main drive motor may be controlled to the zero torque and the output torque of the auxiliary drive motor may be increased by the torque reduction amount according to the zero torque output of the main drive motor.

When the disconnector is in the engaged state, the output torque of the auxiliary drive motor may be controlled so that speed of the auxiliary driving motor may synchronize with wheel speed of the auxiliary drive wheel.

As described above, the present disclosure provides effects as follows.

First, total regeneration torque required in coasting is equally maintained even during the resolver offset learning. Accordingly, backward movement of a vehicle due to the lack of the total regeneration torque does not occur and the resolver offset learning can be stably performed.

Second, the condition for performing the resolver offset learning expands. Accordingly, the period of performing the resolver offset learning can be adjusted to be increased and robustness of the torque control for a drive motor can be secured.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of the present disclosure will be described in detail with reference to the accompanying drawings, items shown in the accompanying drawings are schematic drawings in order to easily describe the embodiment of the present disclosure and may be different from the actual implemented embodiment(s).

Figure 1:
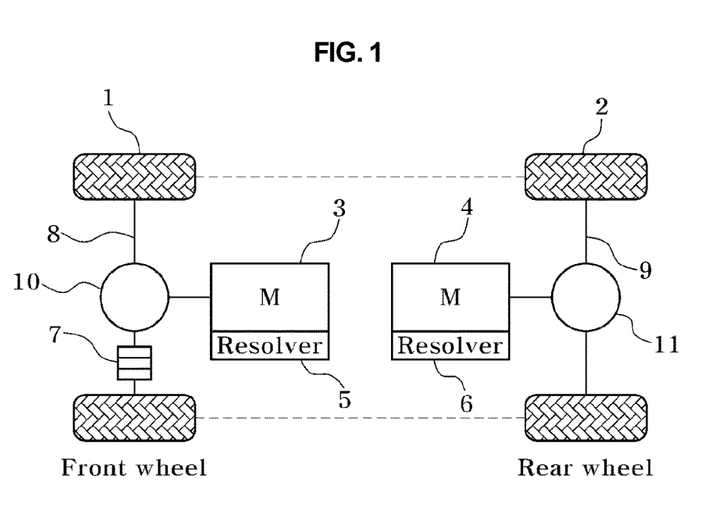
FIG. 1 is a view showing an example of a power transmission structure of a vehicle to which a method of controlling motor torque for learning a resolver offset of an electric vehicle according to the present disclosure may be applied.

FIG. 1 is a view showing an example of a power transmission structure of a vehicle to which a method of controlling motor torque (i.e., a "motor torque control method") for learning a resolver offset of an electric vehicle according to the present disclosure may be applied.

According to the present disclosure, the motor torque control method for learning a resolver offset of an electric vehicle may be applied to a four-wheel drive electric vehicle that runs by driving to a drive motor with power from a battery.

As shown in FIG. 1, the four-wheel drive electric vehicle is a vehicle equipped with a front wheel drive motor 3 for driving a front wheel 1 and a rear wheel drive motor 4 for driving a rear wheel 2. The front wheel drive motor 3 and the rear wheel drive motor 4 may be driven independently of each other.

The four-wheel drive electric vehicle may run in either a four-wheel drive mode or a two-wheel drive mode. When the four-wheel drive electric vehicle runs in the four-wheel drive mode, the four-wheel drive electric vehicle runs using both driving power of the front wheel drive motor 3 and driving power of the rear wheel drive motor 4. When the four-wheel drive electric vehicle runs in the two-wheel drive mode, the four-wheel drive electric vehicle runs using either the driving power of the front wheel drive motor 3 and the driving power of the rear wheel drive motor 4. An unused drive motor and an unused drive wheel when the four-wheel drive electric vehicle runs in the two-wheel drive mode are set in advance.

A drive wheel used during running in the two-wheel drive mode may be referred to a main drive wheel, and an unused drive wheel during running in the two-wheel drive mode may be referred to as an auxiliary drive wheel. In a vehicle using the rear wheel 2 as the main drive wheel when the four-wheel drive electric vehicle runs in the two-wheel drive mode, when the four-wheel drive electric vehicle runs in the two-wheel drive mode, the power of the rear wheel drive motor 4 may be used and the power of the front wheel drive motor 3 may be unused, as set in advance.

For the vehicle using the rear wheel 2 as the main drive wheel, when the four-wheel drive electric vehicle runs in the two-wheel drive mode, the power of the front wheel drive motor 3 is not transmitted to the front wheel 1, i.e., the auxiliary drive wheel, but the reverse driving power is transmitted from the front wheel 1 to a front wheel motor reducer, thereby causing drag loss.

Accordingly, when the four-wheel drive electric vehicle runs in the two-wheel drive mode, a disconnector 7 may be mounted to a front wheel drive shaft 8 to block the reverse driving power transmitted from the front wheel 1 so that the drag loss is prevented. The disconnector 7 may be referred to a dog clutch.

When the front wheel 1 is set as the main drive wheel, the disconnector 7 may be mounted to a rear wheel drive shaft 9 connected to the rear wheel 2, i.e., the auxiliary drive wheel. That is, the disconnector may be mounted to the drive shaft of the auxiliary drive wheel.

In the vehicle in which the disconnector 7 is mounted to the front wheel drive shaft 8, as the disconnector 7 is brought into an engaged state in the four-wheel drive mode, the power of the front wheel drive motor 3 is transmittable through the front wheel drive shaft 8 to the front wheel 1. In addition, as the disconnector 7 is released from the engaged state in the two-wheel drive mode, the power of the front wheel drive motor 3 is not transmittable to the front wheel 1.

As described above, in the four-wheel drive electric vehicle, it is possible to maintain or cut the power transmission from the drive shaft of the auxiliary drive wheel by the engaged state or released state of the disconnector, and the disconnector connects the auxiliary drive wheel to a drive system component to enable the power transmission or blocks the auxiliary drive wheel from the drive system component.

The drive system component is a component that generates or transmits the drive power for driving a vehicle. The drive system component includes a drive motor. The drive motor for driving the auxiliary drive wheel may be referred to an auxiliary drive motor, and a drive motor for driving the main drive wheel may be referred to a main drive motor. When the front wheel 1 is set as the auxiliary drive wheel, the front wheel drive motor 3 is the auxiliary drive motor and the rear wheel drive motor 4 is the main drive motor. When the front wheel 1 is set as the main drive wheel, the front wheel drive motor 3 is the main drive motor, and the rear wheel drive motor 4 is the auxiliary drive motor.

When the front wheel 1 is set as the main drive wheel, the four-wheel drive electric vehicle may run in the two-wheel drive mode in which the power of the front wheel drive motor 3 is used and the power of the rear wheel drive motor 4 is unused. For the operation, the disconnector may be mounted to a drive shaft 9 between the rear wheel 2 and a rear wheel differential 11.

In FIG. 1, the four-wheel drive electric vehicle in which the disconnector 7 is mounted to a drive shaft 8 between the front wheel 1 and a front wheel differential 10 is shown as an example.

Meanwhile, reference numeral 5 is a front wheel resolver 5 mounted to the front wheel drive motor 3, i.e., the auxiliary drive motor, and reference numeral 6 is a rear wheel resolver 6 mounted to the rear wheel drive motor 4, i.e., the main drive motor.

The resolvers 5 and 6 for measuring the electric angle of a motor may be used for the precise torque control for the drive motors 3 and 4. The resolvers 5 and 6 may be mounted in the drive motors 3 and 4 to detect an absolute angle and an absolute position of a motor rotor relative to a motor stator. Each of the resolvers 5 and 6 is a type of position sensor to measure the rotor positions of the drive motors 3 and 4.

When the assembly between a drive motor and a resolver is completed in the automobile manufacturing line, to correct an offset of the resolver (i.e., the position difference between the resolver and a rotor of the drive motor), the offset learning of the resolver is performed at the time when the vehicle assembly is completed. By an offset value calculated by the offset learning, a signal output from the resolver is corrected to remove the offset, and thus, it is possible to apply accurate information about the motor rotor position to the motor torque control. When the rotor position offset of the resolver 5, 6 is not corrected, precise torque control during motor control is impossible.

Therefore, for the precise motor torque control, the offset learning is continuously performed under the predetermined condition even during running of the vehicle.

The resolver offset learning is performed in a situation where the drive motor outputs zero torque and then is rotated by the inertia of the vehicle. Conventionally, when the resolver offset learning is performed in coasting in order to prevent a driver from feeling a sense of heterogeneity, the resolver offset learning is performed only under the limited condition of enabling the freewheeling of the drive motor.

However, in the case of the resolver offset learning performed in coasting, when the drive motor outputs the zero-torque, a total regeneration torque of the vehicle is reduced. As a result, torque leakage occurs and backward movement of a vehicle inevitably occurs, resulting in a sense of heterogeneity.

In the present disclosure, during the vehicle entering the resolver offset learning during running, the amount of torque reduction generated when a drive motor corresponding to the learning target (i.e., a drive motor having a resolver performing the offset learning) outputs zero torque is compensated with an output torque of another drive motor. As a result, the total regeneration torque of the vehicle is satisfied, so that difference caused by backward movement of a vehicle is reduced and at the same time, the resolver offset learning is stably performed.

Hereinbelow, the motor torque control method for learning a resolver offset of an electric vehicle according to the present disclosure will be described with reference to FIGS. 2 to 6.

Figure 2:
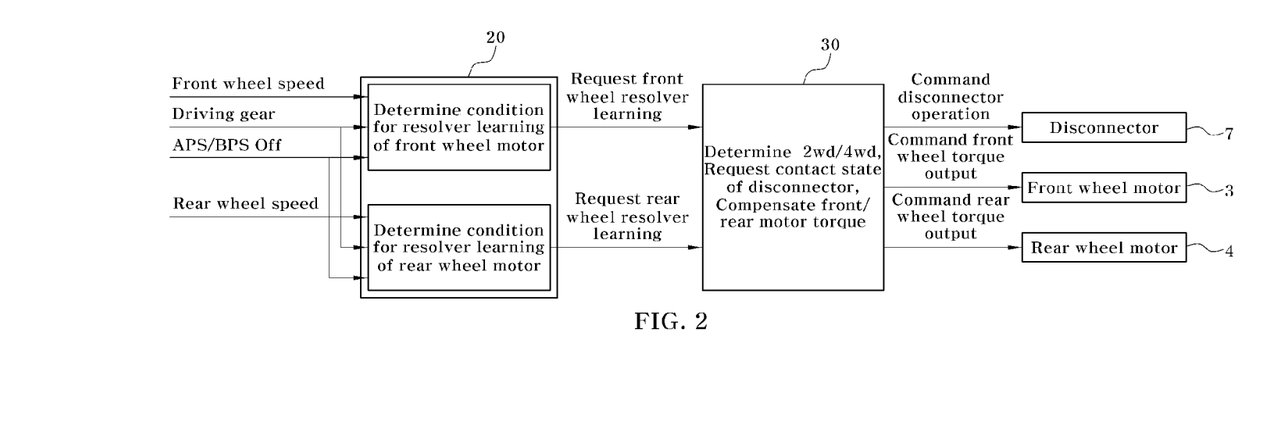
FIG. 2 is a view showing the configuration of an apparatus performing a process of controlling motor torque for learning a resolver offset of an electric vehicle according to the present disclosure.

FIG. 2 is a view showing the configuration of an apparatus performing a process of controlling motor torque (i.e., "motor torque control process") for learning a resolver offset of an electric vehicle according to the present disclosure.

The process of controlling motor torque according to the present disclosure may be performed by a control unit installed in a vehicle. In particular, the process of controlling motor torque is executed by the vehicle control unit (VCU) 20 and a motor control unit (MCU) 30, as shown in FIG. 2.

The VCU 20 determines whether a condition for performing the offset learning of the resolver 5, 6 is satisfied during running of the vehicle.

In particular, the VCU 20 determines whether the condition for performing the offset learning of the resolver 5, 6 is satisfied, on the basis of accelerator pedal position information, brake pedal position information, transmission gear position information, and wheel speed information.

The VCU 20 may determine whether the condition for performing the offset learning of the resolver 5, 6 is satisfied when the accelerator pedal and the brake pedal are not in operation, a transmission gear is positioned on the running gear (D stand), and a wheel speed is equal to and higher than a preset first wheel speed value.

The VCU 20 may determine that the accelerator pedal and the brake pedal are not in operation, when a pedal position value or a degree of pressing pedal, which is obtained based on output signals of an accelerator pedal position sensor (APS) and a brake pedal position sensor (BPS) enabling determination of the driver's intent to accelerate and decelerate, is zero.

The VCU 20 may determine whether the vehicle runs in coasting, on the basis of the accelerator pedal information and the brake pedal information, and may determine whether the condition for performing the offset learning of the resolver 5, 6 is satisfied, on the basis of the wheel speed information and the transmission gear information in coasting.

The first wheel speed value may be preset to a minimum wheel speed value capable of performing the offset learning of the resolver 5, 6. To perform the offset learning of the resolver 5, 6, a wheel speed of a related wheel should be equal to or higher than a speed value for freewheeling of the drive motor.

When a resolver to perform the offset learning is the front wheel resolver 5, the VCU 20 determines whether the condition for performing the offset learning is satisfied on the basis of front wheel speed information. When the resolver to perform the offset learning is the rear wheel resolver 6, the VCU 20 determines whether the condition for performing the offset learning is satisfied on the basis of rear wheel speed information.

The VCU 20 may receive the wheel speed information and the pedal position information by a wheel speed sensor and the pedal position sensor, etc., and may receive the transmission gear information from a transmission control unit (TCU) installed in the vehicle.

When the VCU 20 determines that the condition for performing the resolver offset learning is satisfied, the VCU 20 requests the MCU 30 to perform the offset learning of the related resolver.

In particular, when the condition for performing the offset learning of the front wheel resolver 5 is satisfied, the VCU 20 may request the offset learning of the front wheel resolver 5, and when the condition for performing the offset learning of the rear wheel resolver 6 is satisfied, the VCU 20 may request the offset learning of the rear wheel resolver 6.

When the MCU 30 is requested for performing the offset learning of the resolver 5, 6 from the VCU 20, the MCU 30 controls an output torque of a drive motor (i.e., a "learning drive motor") having a related resolver for performing the offset learning, among the front wheel drive motor 3 and the rear wheel drive motor 4 to a zero torque. This control is intended to maintain a status of freewheeling of the learning drive motor.

When an offset learning target is the front wheel resolver 5, the MCU 30 controls an output torque of the front wheel drive motor 3 to a zero torque, and when an offset learning target is the rear wheel resolver 6, the MCU 30 controls an output torque of the rear wheel drive motor 4 to a zero torque.

When an output torque of a learning drive motor is controlled to a zero torque, the MCU 30 performs the offset learning of a resolver mounted in the learning drive motor, and at the same time, the MCU 30 compensates the torque reduction amount due to the learning drive motor outputting zero torque with an output torque of another drive motor. The other drive motor is a drive motor (i.e., a "non-learning drive motor") in which a resolver that does not perform the offset learning is mounted.

In coasting, the drive motor 3, 4 outputs a regeneration torque by reverse drive power applied through a wheel. In particular, the vehicle runs in coasting in two-wheel drive, the rear wheel drive motor 4 receives the reverse drive power through the rear wheel 2, i.e., the main drive wheel. When the vehicle runs in coasting in the four-wheel drive, the front wheel drive motor 3 and the rear wheel drive motor 4 receive the reverse drive power through the front wheel 1 and the rear wheel 2, respectively.

Accordingly, when the learning drive motor outputs zero torque in coasting, a total regeneration torque of the vehicle may be reduced by a regeneration torque of the learning drive motor, and thus vehicle roll-back may occur.

In other words, as the learning drive motor is controlled to output zero torque for learning a resolver offset, the total regeneration torque of the vehicle may be reduced by the regeneration torque outputting from the learning drive motor before the resolver offset learning is performed.

Therefore, the MCU 30 increases an output torque of the non-learning drive motor by the torque reduction amount of the learning drive motor for the resolver offset learning. The torque reduction amount is the regeneration torque output from the learning drive motor before performing the resolver offset learning, and the torque reduction amount may be referred to as a "regeneration torque" or a "pre-learning torque" of the learning drive motor.

Therefore, when the output torque of the learning drive motor is controlled to zero torque for performing the resolver offset learning, the MCU 30 increases the output torque of the non-learning drive motor by the pre-learning torque of the learning drive motor.

Accordingly, when the output torque of the learning drive motor is controlled to a zero torque, the non-learning drive motor is controlled to output a torque value (i.e., the total regeneration torque of the vehicle) calculated by summing a regeneration torque of the non-learning drive motor and the pre-learning torque of the learning drive motor.

In other words, during the resolver offset learning, a compensation torque for compensating the output torque of the non-learning drive motor is set as a value of the pre-learning torque of the learning drive motor, and as a result, the non-learning drive motor outputs the total regeneration torque of the vehicle.

When the non-learning drive motor is the front wheel drive motor 3, the MCU 30 controls the output torque of the front wheel drive motor 3 so that the front wheel drive motor 3 outputs the total regeneration torque. When the non-learning drive motor is the rear wheel drive motor 4, the MCU 30 controls the output torque of the rear wheel drive motor 4 so that the rear wheel drive motor 4 outputs the total regeneration torque.

As described above, the output torque of the non-learning drive motor is increased by being compensated with the torque reduction amount of the learning drive motor for performing the resolver offset learning, so that a driver request torque in coasting is satisfied. In addition, the learning drive motor outputs a zero torque, so that a sense of vehicle roll-back may be prevented from occurring.

Meanwhile, when the resolver offset learning is completed in coasting, the MCU 30 recovers the output torque of the learning drive motor and the output torque of the non-learning drive motor to torque values before the resolvers 5 and 6 perform the offset learning.

In particular, the MCU 30 increases the output torque of the learning drive motor from zero torque to the pre-learning torque, and reduces the output torque of the non-learning drive motor to a value of the regeneration torque before the resolver offset learning is performed. The regeneration torque of the non-learning drive motor is a torque value calculated by subtracting the pre-learning torque from the total regeneration torque of the vehicle.

When the MCU 30 is requested for the offset learning of the resolver 5, 6, the MCU 30 determines whether the vehicle is in the four-wheel drive mode in which the vehicle runs by the four-wheel drive or the two-wheel drive mode in which the vehicle runs by the two-wheel drive.

When the MCU 30 determines that the vehicle runs by the four-wheel drive, the MCU 30 performs the motor torque control for performing the offset learning of the front wheel resolver 5. When the MCU 30 determines that the vehicle runs by the two-wheel drive, the MCU 30 executes engagement operation of the disconnector 7 before performing the motor torque control.

When the engagement operation of the disconnector 7 is completed, the reverse drive power is transmitted to the front wheel drive motor 3 through the front wheel 1, i.e., the auxiliary drive wheel. As a result, the front wheel drive motor 3 may output torque corresponding to a regeneration torque of the rear wheel drive motor 4.

Figure 3:
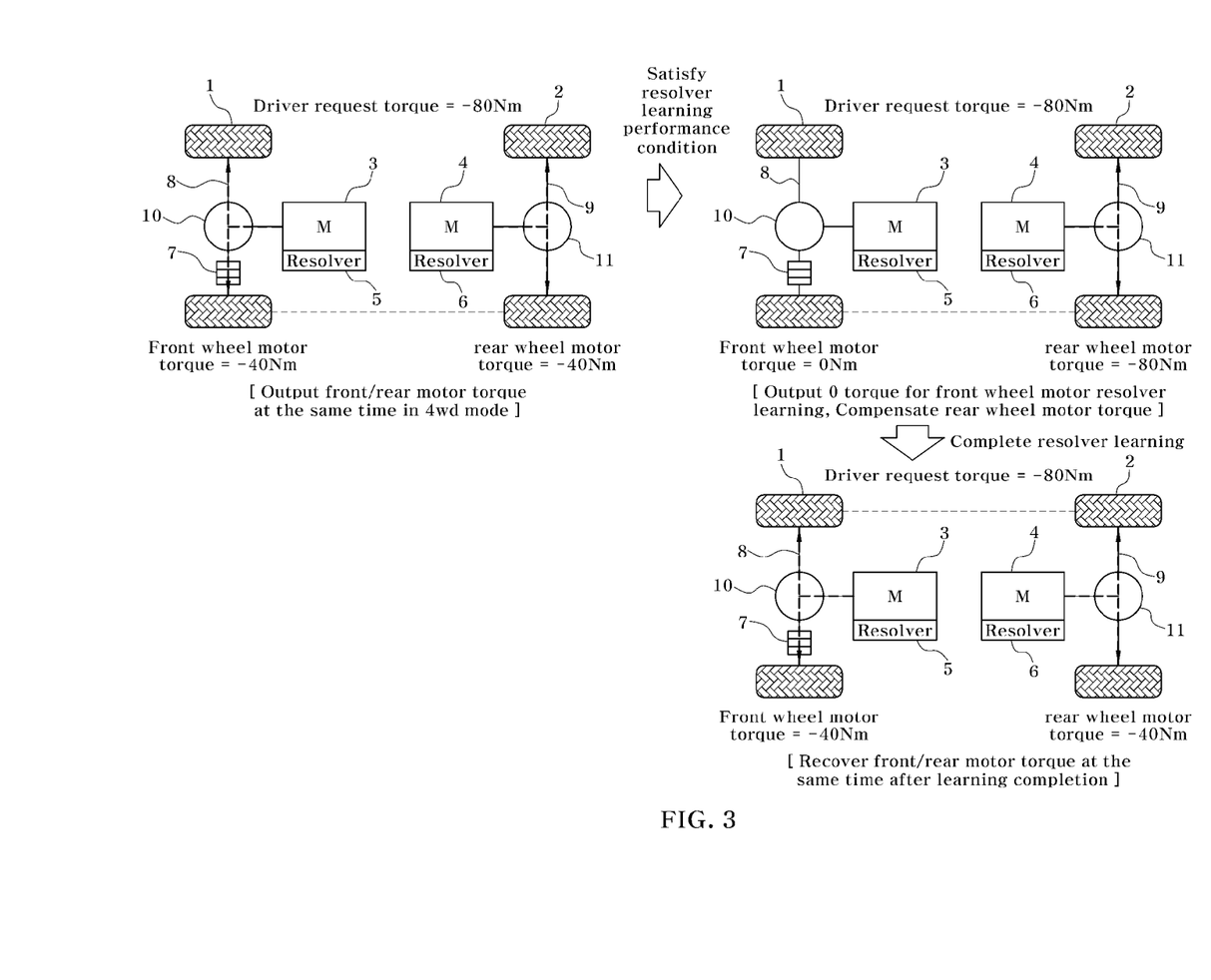
FIG. 3 is a mimetic diagram showing the process of controlling motor torque for learning a resolver offset of an electric vehicle according to an embodiment of the present disclosure according to the present disclosure.
Figure 4:
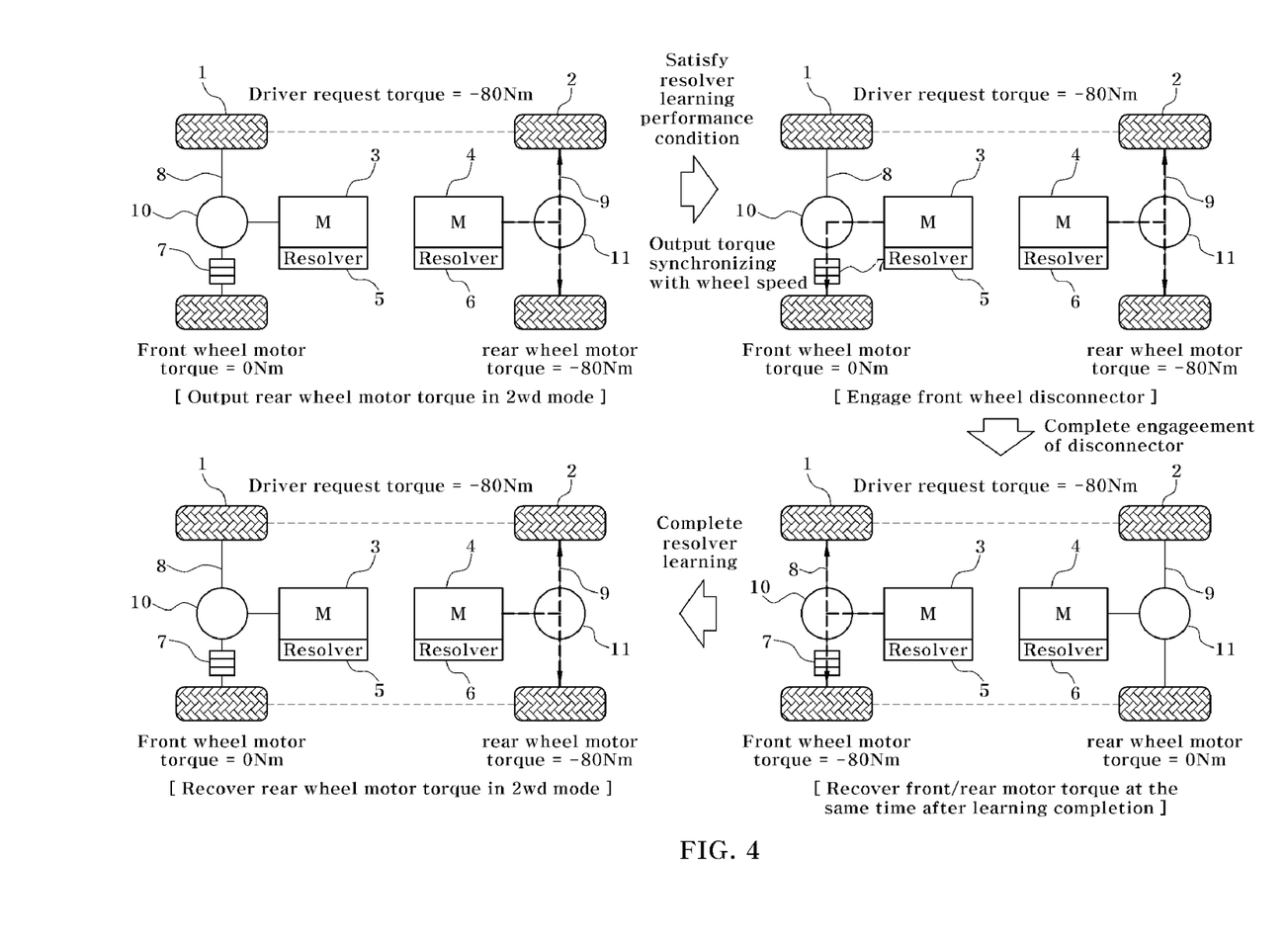
FIG. 4 is a mimetic diagram showing the process of controlling motor torque for learning a resolver offset of an electric vehicle according to another embodiment of the present disclosure.
Figure 5:
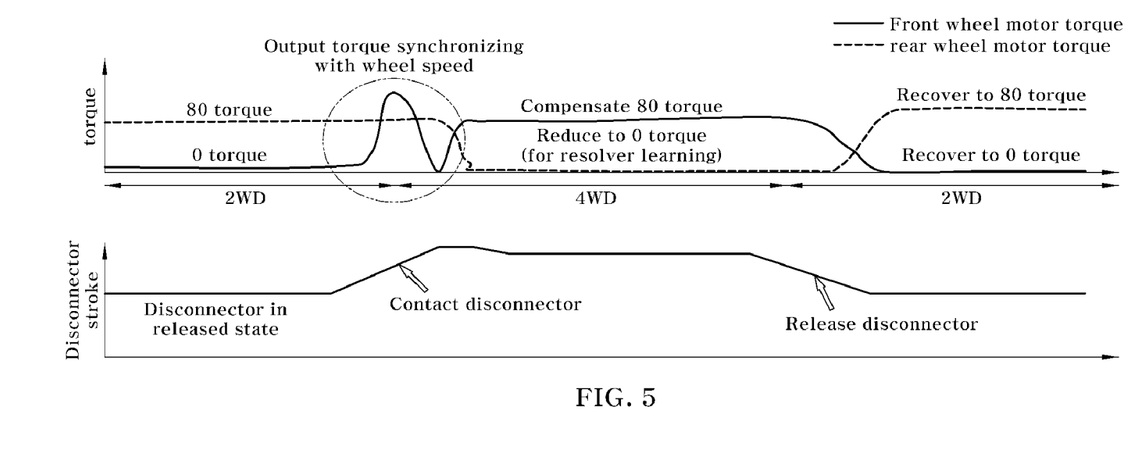
FIG. 5 is a graph showing variation in torque of a drive motor and variation in stroke of a dog clutch in response to the motor torque control of the present disclosure.

FIG. 3 is a mimetic diagram showing the process of controlling motor torque for learning a resolver offset of an electric vehicle according to an embodiment of the present disclosure. FIG. 4 is a mimetic diagram showing the process of controlling motor torque for learning a resolver offset of an electric vehicle according to another embodiment of the present disclosure. FIG. 5 is a graph showing variation in torque of a drive motor and variation in a stroke of a dog clutch in response to the motor torque control of the present disclosure.

First, referring to FIG. 3, a process of controlling torque of the drive motor 3, 4 when the offset learning of the front wheel resolver 5 is performed during running by the four-wheel drive will be described.

As shown in FIG. 3, when the vehicle runs in coasting by the four-wheel drive, the disconnector 7 is in the engaged state, and the front wheel drive motor 3 and the rear wheel drive motor 4 output the regeneration torque, respectively.

At this point, the front wheel drive motor 3 and the rear wheel drive motor 4 may output torque values calculated by dividing the driver request torque in half. For example, when the driver request torque is −80 Nm, the front wheel drive motor 3 and the rear wheel drive motor 4 output −40 Nm, respectively, at the same time.

During coasting by the four-wheel drive, when the condition of performing the offset learning of the front wheel resolver 5 is satisfied, the output torque of the front wheel drive motor 3 is controlled to a zero torque, and the output torque of the rear wheel drive motor 4 is controlled to −80 Nm compensated by a regeneration torque of the front wheel drive motor 3.

The −80 Nm is the total regeneration torque of the vehicle, which is the sum of the regeneration torque of the front wheel drive motor 3 and the regeneration torque of the rear wheel drive motor 4 that were output before the offset learning of the front wheel resolver 5 was performed.

When the offset learning of the front wheel resolver 5 is completed, the output torque of the front wheel drive motor 3 and the output torque of the rear wheel drive motor 4 are recovered to regeneration torque values before the offset learning of the front wheel resolver 5 is performed.

Next, the torque control method for the drive motors 3 and 4 when the offset learning of the rear wheel resolver 6 is performed during running by the two-wheel drive 2 will be described in reference to FIG. 4.

As shown in FIG. 4, when the vehicle runs in coasting by the two-wheel drive, the disconnector 7 is released from the engaged state, the rear wheel drive motor 4, i.e., the main drive motor, outputs a regeneration torque in response to the driver request torque. That this time, the rear wheel drive motor 4 outputs the total regeneration torque of the vehicle. For example, when the driver request torque is −80 Nm, the rear wheel drive motor 4 outputs all of −80 Nm.

When the condition for performing the offset learning of the rear wheel resolver 6 is satisfied during coasting by the two-wheel drive, as the disconnector 7 is brought into the engaged state, the front wheel 1 and the front wheel drive motor 3 may be connected to each other to be power-transmittable. In the engaged state of the disconnector 7, the rotating speed of the front wheel drive motor 3 synchronizes with the wheel speed of the front wheel 1.

Referring to FIG. 5, the condition for performing the offset learning of the rear wheel resolver 6 is satisfied during coasting by the two-wheel drive, the disconnector 7 is fastened for connection between the front wheel 1 and the front wheel drive motor 3, and when fastening of the front wheel disconnector 7 is performed, the output torque of the front wheel drive motor 3 is controlled so that the rotating speed of the front wheel drive motor 3 synchronizes with the wheel speed of the front wheel 1.

When the engagement operation of the front wheel disconnector 7 is completed, the output torque of the rear wheel drive motor 4 is controlled to a zero torque, and the output torque of the front wheel drive motor 3 is compensated by the regeneration torque of the rear wheel drive motor 4.

When the output torque of the rear wheel drive motor 4 is maintained to zero torque and the output torque of the front wheel drive motor 3 is maintained to the total regeneration torque, the offset learning of the rear wheel resolver 6 is performed.

When the offset learning of the rear wheel resolver 6 is completed, the output torque of the front wheel drive motor 3 and the output torque of the rear wheel drive motor 4 are recovered to regeneration torque values before the offset learning of the rear wheel resolver 6 is performed. For example, the output torque of the front wheel drive motor 3 is reduced to 0 Nm and the output torque of the rear wheel drive motor 4 is increased to −80 Nm. At this time, the front wheel disconnector 7 is also recovered to the released state.

Hereinbelow, the motor torque control process for the resolver offset learning of an electric vehicle according to the present disclosure will be described sequentially with respect to FIG. 6. However, FIG. 6 is a flowchart illustrating the motor torque control method according to the present disclosure, and the motor torque control method according to the present disclosure is not limited to the order in FIG. 6.

Figure 6:
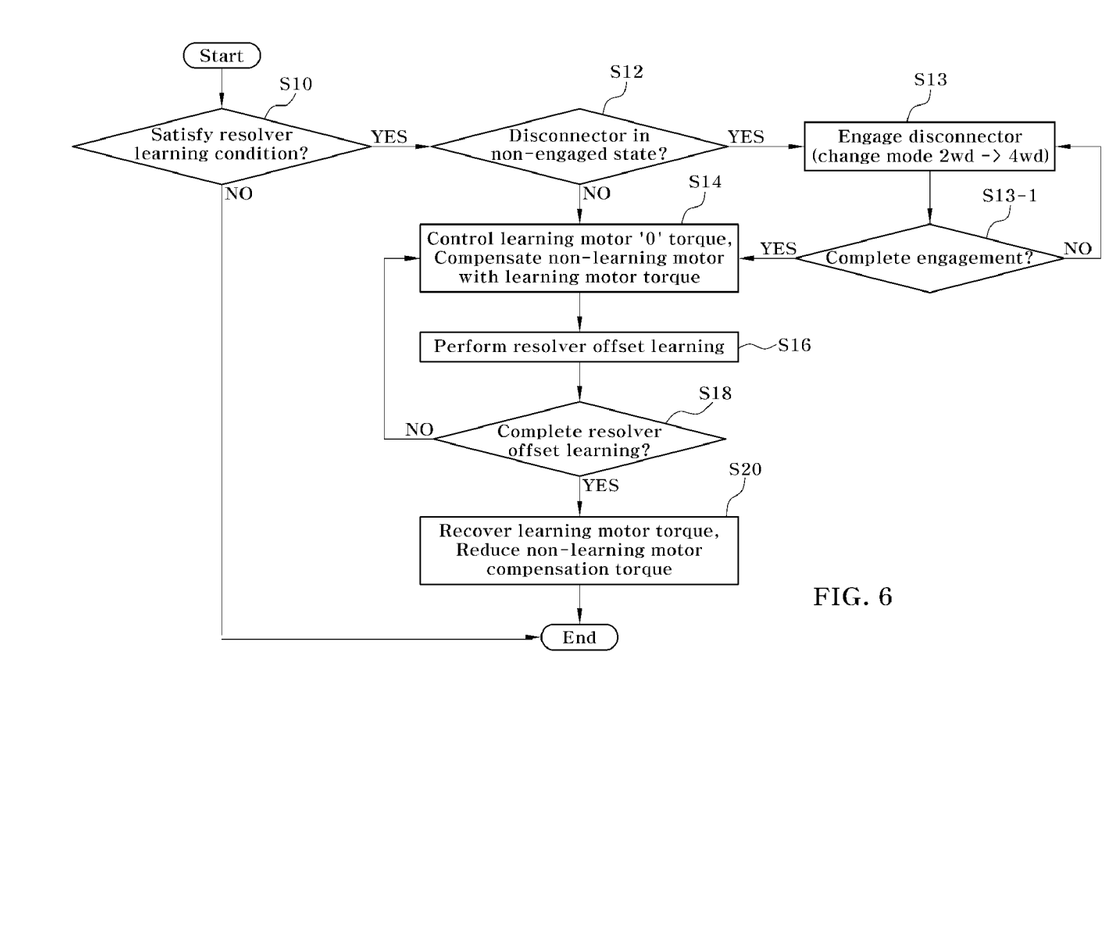
FIG. 6 is a flowchart showing the method of controlling motor torque for learning a resolver offset of an electric vehicle according to the embodiment of the present disclosure.

As illustrated in FIG. 6, it is determined whether a condition for performing the resolver offset learning is satisfied (S10). When the condition is satisfied, it is determined whether the disconnector 7 is in the engaged state (S12).

When the disconnector 7 is in the engaged state in advance, an output torque of a learning drive motor is controlled to a zero torque, and an output torque of an non-learning drive motor is compensated by being increased by a pre-learning torque of the learning drive motor (S14).

When the disconnector 7 is in the engaged state, the learning drive motor may be set as the front wheel drive motor 3, i.e., the auxiliary drive motor, and the non-learning drive motor may be set as the rear wheel drive motor 4, i.e., the main drive motor.

Next, the offset learning of a resolver mounted in the learning drive motor is performed (S16). An offset value of the resolver obtained by the offset learning is used to compensate an output signal of the resolver.

It is determined whether the offset learning of the resolver is completed (S18). When the offset learning is in progress, the output torque of the learning drive motor is maintained to a zero torque, and the output torque of the non-learning drive motor is maintained to a torque value obtained by being compensated with the pre-learning torque (i.e., total regeneration torque value of the vehicle).

When the offset learning is completed, the output torque of the learning drive motor and the output torque of the non-learning drive motor are recovered to torque values before the offset learning is performed (S20). Accordingly, the output torque of the learning drive motor is recovered from zero torque to a torque value before the offset learning is performed, and the output torque of the non-learning drive motor is reduced by the pre-learning torque and recovers to the regeneration torque value before the resolver offset learning is performed.

As a result of the determining in S12, when the disconnector 7 is released from the engaged state, before performing torque control of the learning drive motor and the non-learning drive motor, the engagement operation of the disconnector 7 is performed (S13). When the engagement operation of the disconnector 7 is performed, the vehicle is switched from the two-wheel drive to the four-wheel drive.

Next, it is determined whether the engagement operation of the disconnector 7 is completed (S13-1). When the engagement operation of the disconnector 7 is completed, the output torque of the learning drive motor is controlled to be reduced to a zero torque, and the output torque of the non-learning drive motor is compensated by being increased by the torque reduction amount of the learning drive motor (S14).

When the engaged state of the disconnector 7 is requested, the learning drive motor may be the rear wheel drive motor 4, i.e., the main drive motor, and the non-learning drive motor may be the front wheel drive motor 3, i.e., the auxiliary drive motor.

The offset learning of the resolver mounted in the learning drive motor is performed (S16), and it is determined whether the resolver offset learning is completed (S18). When the offset learning is completed, the output torque of the learning drive motor and the output torque of the non-learning drive motor are recovered torque values before the offset learning is performed (S20).

The resolver offset learning is performed while the output torque of the learning drive motor is maintained to zero torque and the output torque of the non-learning drive motor is maintained to a torque value compensated with the torque reduction amount of the learning drive motor.

The embodiments of the present disclosure have been described in detail above, and should be noted that the terms and words used in the specification and the claims should not be construed as being limited to ordinary meanings or dictionary definitions. Further, the embodiments described in the specification and the configurations illustrated in the drawings are merely examples and the scope and spirit of the present disclosure are not limited to the embodiment described hereinabove, and various modifications and improvements of those skilled in the art which uses the basic concept of the present disclosure defined by the appended claims are also included in the scope and spirit of the present disclosure.

What is claimed is:

1. A method of controlling motor torque for learning a resolver offset of an electric vehicle, the electric vehicle comprising a main drive motor for driving a main drive wheel and an auxiliary drive motor for driving an auxiliary drive wheel, the method comprising:
   determining, by a vehicle control unit, whether a condition for offset learning of a plurality of resolvers mounted to the main drive motor and to the auxiliary drive motor is satisfied;
   controlling, by a motor control unit, an output torque of a learning drive motor, which includes a resolver of the plurality of resolvers to perform the offset learning among the main drive motor and the auxiliary drive motor to a zero torque, when the condition for performing the offset learning is satisfied;
   increasing, by the motor control unit, an output torque of a non-learning drive motor, which includes a resolver of the plurality of resolvers not performing the offset learning among the main drive motor and the auxiliary drive motor by a torque reduction amount, when the learning drive motor outputs zero torque; and
   performing, by the motor control unit, the offset learning of the resolver mounted to the learning drive motor;
   determining whether a disconnector connecting the auxiliary drive motor to the auxiliary drive wheel to be power-transmittable is in an engaged state,
   wherein, when the condition for the resolver offset learning is satisfied and the disconnector is in the engaged state:
      the auxiliary drive motor is set as the learning drive motor, and
      the main drive motor is set as the non-learning drive motor;
   wherein, when the condition for the resolver offset learning is satisfied and the disconnector is released from the engaged state:
      the auxiliary drive motor and the auxiliary drive wheel are connected to be power-transmittable as the disconnector is brought into the engaged state, and
      the main drive motor is set as the learning drive motor and the auxiliary drive motor is set as the non-learning drive motor; and
   wherein, when the electric vehicle runs in coasting, it is determined that the condition for performing the offset learning is satisfied.

2. The method of claim 1, wherein while performing the offset learning of the resolver mounted to the learning drive motor, the output torque of the learning drive motor is maintained to zero torque, and the output torque of the non-learning drive motor is maintained to a torque value compensated with the torque reduction amount of the learning drive motor.

3. The method of claim 2, wherein the torque reduction amount of the learning drive motor is the output torque that is output by the learning drive motor before the learning drive motor performs the resolver offset learning.

4. The method of claim 1, further comprising:
recovering the output torque of the learning drive motor and the output torque of the non-learning drive motor to torque values before performing the resolver offset learning, when the resolver offset learning is completed.

5. The method of claim 1, wherein, when an acceleration pedal and a brake pedal are not in operation, a transmission gear is located on a running gear, and wheel speed is equal to or higher than a preset value of the wheel speed, it is determined that the condition for performing the resolver offset learning is satisfied.

6. The method of claim 1, wherein when the disconnector is in the engaged state, the output torque of the auxiliary drive motor is controlled so that speed of the auxiliary driving motor synchronizes with wheel speed of the auxiliary drive wheel.

\* \* \* \* \*